(12) United States Patent
Rogers (10) Patent No.: US 12,208,924 B1
(45) Date of Patent: Jan. 28, 2025

(54) AIRCRAFT ENGINE INSTALLATION ALIGNMENT SYSTEM

(71) Applicant: Government of the United States, as represented by the Secretary of the Air Force, Wright-Patterson AFB, OH (US)

(72) Inventor: Travis Rogers, Litchfield Park, AZ (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/385,921

(22) Filed: Nov. 1, 2023

Related U.S. Application Data (60) Provisional application No. 63/430,710, filed on Dec. 7, 2022.

(51) Int. Cl.
  *B64F 5/10* (2017.01)
  *G01B 11/27* (2006.01)

(52) U.S. Cl.
  CPC ............... *B64F 5/10* (2017.01); *G01B 11/27* (2013.01)

(58) Field of Classification Search
  CPC ........... G01B 11/27; B64F 5/50; B64D 27/40
  See application file for complete search history.

(56) References Cited

U.S. PATENT DOCUMENTS

| | | | |
|---|---|---|---|
| 4,437,627 A | | 3/1984 | Moorehead |
| 6,098,297 A | * | 8/2000 | Belfiore ................ G01B 11/27 33/286 |
| 6,485,247 B1 | * | 11/2002 | Groves ..................... B64F 5/50 180/125 |
| 8,533,965 B2 | * | 9/2013 | Stromberg ............. G01B 11/27 33/412 |
| 8,552,836 B2 | * | 10/2013 | Pollema ................... G05D 3/12 340/686.2 |
| 8,833,776 B2 | * | 9/2014 | Boulanger ................ B66F 9/06 280/47.131 |
| 9,605,951 B2 | * | 3/2017 | Hölzl ..................... G01B 11/14 |
| 9,714,585 B2 | * | 7/2017 | Morey .................. F01D 25/285 |
| 9,719,375 B2 | * | 8/2017 | Burns ................... F01D 25/243 |
| 10,464,685 B2 | | 11/2019 | Whiteford et al. |
| 10,899,463 B2 | * | 1/2021 | Aten ..................... B64D 27/18 |

(Continued)

FOREIGN PATENT DOCUMENTS

| | | | | |
|---|---|---|---|---|
| CN | 105345452 A | * | 2/2016 | ............ B23P 19/105 |
| KR | 101972767 B1 | * | 4/2019 | ............. G01B 11/14 |

OTHER PUBLICATIONS

KR101972767B1 (Year: 2019).*
CN-105345452-A (Year: 2016).*

*Primary Examiner* — Michael W Hotchkiss
(74) *Attorney, Agent, or Firm* — AFMCLO/JAZ; Matthew D. Fair (57) ABSTRACT

A laser guided alignment system for facilitating installation of an aircraft engine into an engine bay of an aircraft is disclosed herein. A laser assembly may be attached to one or more rails of an engine trailer or rails of an engine bay. A laser receiving assembly may be attached to one or more of the rails of the engine bay or the rails of the trailer. The engine can be moved from the trailer to the engine bay when the laser guide assembly is aligned on target.

18 Claims, 11 Drawing Sheets

(56) References Cited

U.S. PATENT DOCUMENTS

| | | | | |
|---|---|---|---|---|
| 11,326,477 | B2* | 5/2022 | Le Gall | F01D 25/28 |
| 2002/0152622 | A1* | 10/2002 | Granger | G01B 11/002 |
| | | | | 33/288 |
| 2008/0011932 | A1* | 1/2008 | Stretton | B66C 1/107 |
| | | | | 414/800 |
| 2010/0155566 | A1* | 6/2010 | Linz | B66C 17/06 |
| | | | | 29/700 |
| 2012/0110816 | A1* | 5/2012 | Groves | F01D 25/285 |
| | | | | 254/7 C |
| 2020/0325797 | A1* | 10/2020 | Wright | B64F 5/10 |
| 2021/0148253 | A1* | 5/2021 | Le Gall | B23P 15/04 |
| 2022/0212908 | A1* | 7/2022 | Frizzell | B66F 3/24 |
| 2024/0134142 | A1* | 4/2024 | Moses | B64D 47/02 |

* cited by examiner

AIRCRAFT ENGINE INSTALLATION ALIGNMENT SYSTEM

Pursuant to 37 C.F.R. § 1.78(a)(4), this application claims the benefit of and priority to prior filed Provisional Application Ser. No. 63/430,710, filed Dec. 7, 2022, which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to a method, system and apparatus for aligning an aircraft engine in an engine bay during installation, and more particularly, but not exclusively using a laser system to ensure engine trailer alignment.

BACKGROUND

Prior Art engine installation into military aircraft such as the F-35 are time consuming and difficult because of the potential cost associated with damaging the engine and/or the aircraft. Removing and installing an aircraft engine requires an installation trailer to be precisely aligned with the aircraft. In order to align the trailer, a lead technician has to physically move the trailer while requesting other technicians make smaller adjustments to the height, angle, and orientation of the trailer. The trailer and engine are too large for the lead technician see the field of view in front of the trailer and is unable to directly control how much the trailer's alignment is adjusted. Moreover, communication between technicians can often result in overcompensation in adjustments or insufficient adjustments as well; however, the lead technician has no way of knowing this due to the aforementioned lack of a field of view.

Due to the tight tolerances and the deficiencies in the installation process, aligning the trailer can take up to eight hours and can result in damage to the trailer and/or engine. A small trailer misalignment alignment is magnified by the extreme weight of the engine while it is in motion. If the engine trailer is damaged, it must be shipped to a repair station that can have turnaround times of greater than six months. It is clear that the prior art method for installing an aircraft engine is fraught with many drawbacks and deficiencies. Accordingly, there remains a need for further contributions in this area of technology.

SUMMARY

One embodiment of the present disclosure includes a system for installing an aircraft engine into an engine bay of a military aircraft. Other embodiments include apparatuses, systems, devices, hardware, methods, and combinations for a laser system to help align an installation trailer with a rail system on the aircraft. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended by the illustrations and descriptions of the illustrative embodiment(s). Any alterations and further modifications in the described embodiments, and any further applications of the principles of the invention as described herein are contemplated as would normally occur to one skilled in the art to which the invention relates.

Figure 1:
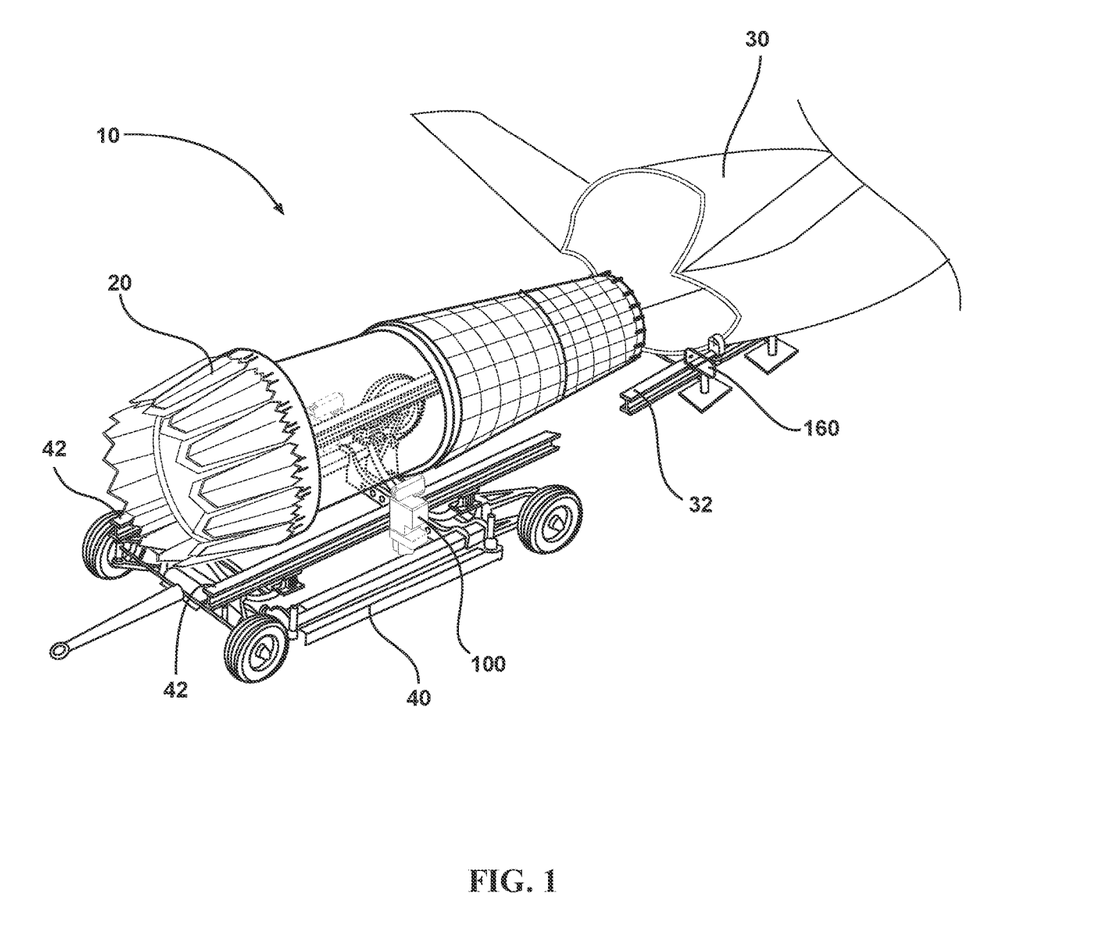
FIG. 1 is a schematic view of an aircraft engine installation trailer and laser guidance system according to one embodiment of the present disclosure.

Referring to FIG. 1, an engine installation alignment system 10 is disclosed therein. An aircraft engine 20 is in position to be installed into an aircraft engine bay 30 of an aircraft such as an F-35 or the like. An installation trailer 40 is configured to hold the aircraft engine 20 and to be maneuvered into a precise location where the engine 30 is aligned with engine bay 30 so that it can be installed without being misaligned. The aircraft engine bay 30 includes a pair of engine bay rails 32 (only one rail can be seen in this view) for the engine 20 to slide onto during installation into the aircraft. The installation trailer 40 includes a pair of engine trailer rails 42 that are parallel and are required to be aligned with the engine bay rails 32 during engine installation. A laser transmitter assembly 100 may be positioned onto one or both of the engine trailer rails 42. A laser receiver target assembly 160 may be positioned onto one or both of the aircraft engine bay rails 32. In alternate embodiments, the laser transmitter assembly 100 may be positioned on the engine bay rails 32 and the laser receiver target assembly 160 may be positioned on the engine trailer rails 42.

Figure 2:
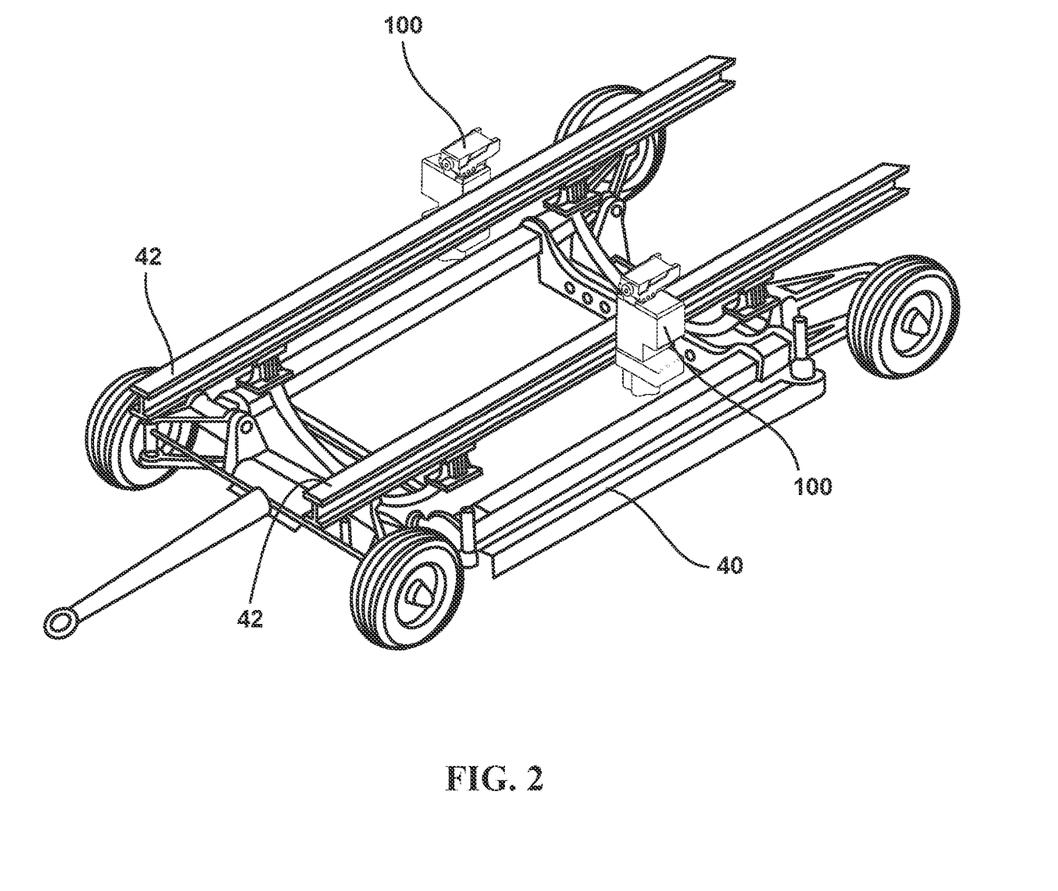
FIG. 2 is a perspective view of the engine trailer shown in FIG. 1 without the engine.

FIG. 2 shows the engine trailer 40 with the engine removed for clarity. A laser transmitter assembly 100 is positioned on each of the trailer rails 42 and are used to align the trailer 40 so that the engine can be installed into the engine bay 30 with an exact alignment so that the process may be competed without damaging the trailer 40, the engine 20 or the aircraft.

Figure 3:
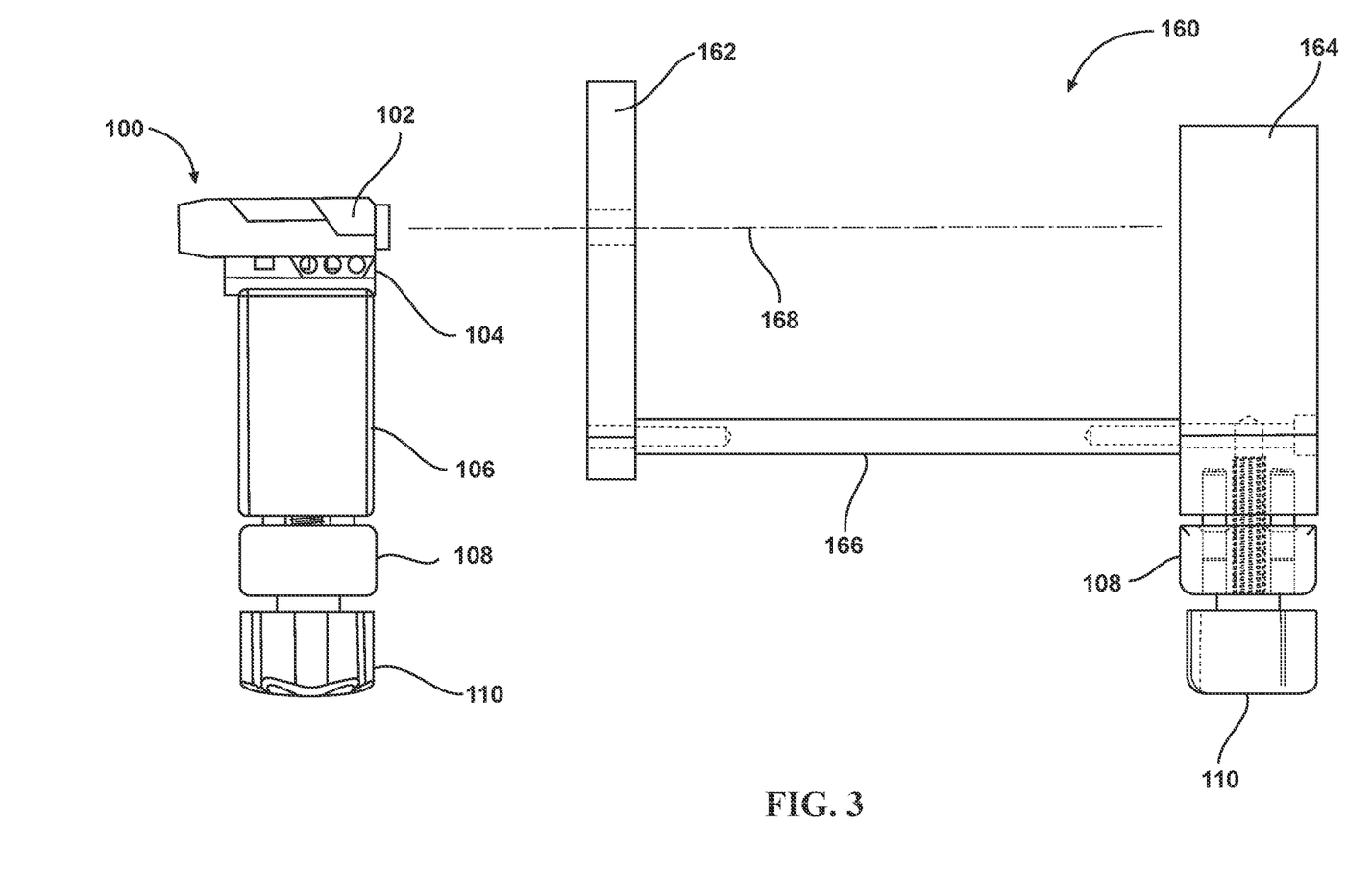
FIG. 3 is a side view of a laser transmitter assembly and laser receiver target assembly.

FIG. 3 is a schematic side view of the laser transmitter assembly 100 and laser receiver target assembly 160. The laser transmitter assembly 100 includes a laser transmitter 102. In various forms, the laser transmitter 102 can transmit a red laser beam, green laser beam or other type that one skilled in the art would readily understand. The laser transmitter 102 is connected to a connector element 104. The connector element 104 can be a standard connector with slides such as picatinny rails that are used in many industries to connect components together. In other forms, the connector element 104 may be a specialized design made specifically for this application. The connector element 104 is connected to a mounting block 106 on the opposing side to the side connected to the laser transmitter 102. A screw block 108 is connected to the mounting block 106 via a hand screw 110. The hand screw 110 is operable for tightening and locking the screw block 108 and the mounting block 106 to a trailer rail 42 or an engine bay rail 32 discussed above in FIG. 1. Although not all delineated, other types of mechanical connection means are contemplated herein. By way of example and not limitation, nut/bolt combinations, clamps, magnets, or other means known to those skilled may be used to connect the laser assemblies to the aircraft or trailer. Installation procedures will be discussed in more detail below.

The laser receiver target assembly 160 includes a forward target plate 162 that is connected to a target block 164 via a target bridge 166. A target screw block 108 is coupled to the target block 164 with a hand screw 110. The target screw block 108 in the laser receiver target assembly 160 is interchangeable with the screw block 108 in the laser transmitter assembly 100. Like the laser transmitter assembly 100, the hand screw 110 is operable for tightening and locking the target screw block screw block 108 and the target block 164 to a trailer rail 42 or an engine bay rail 32. A laser beam 168 is transmitted by the laser 102 such that it will pass through a predefined location on the forward target plate 162 and strike a target location on the target block 164 when the trailer 40 is aligned with the engine bay 30. Further details of the laser alignment system 10 will be described below.

Figure 4:
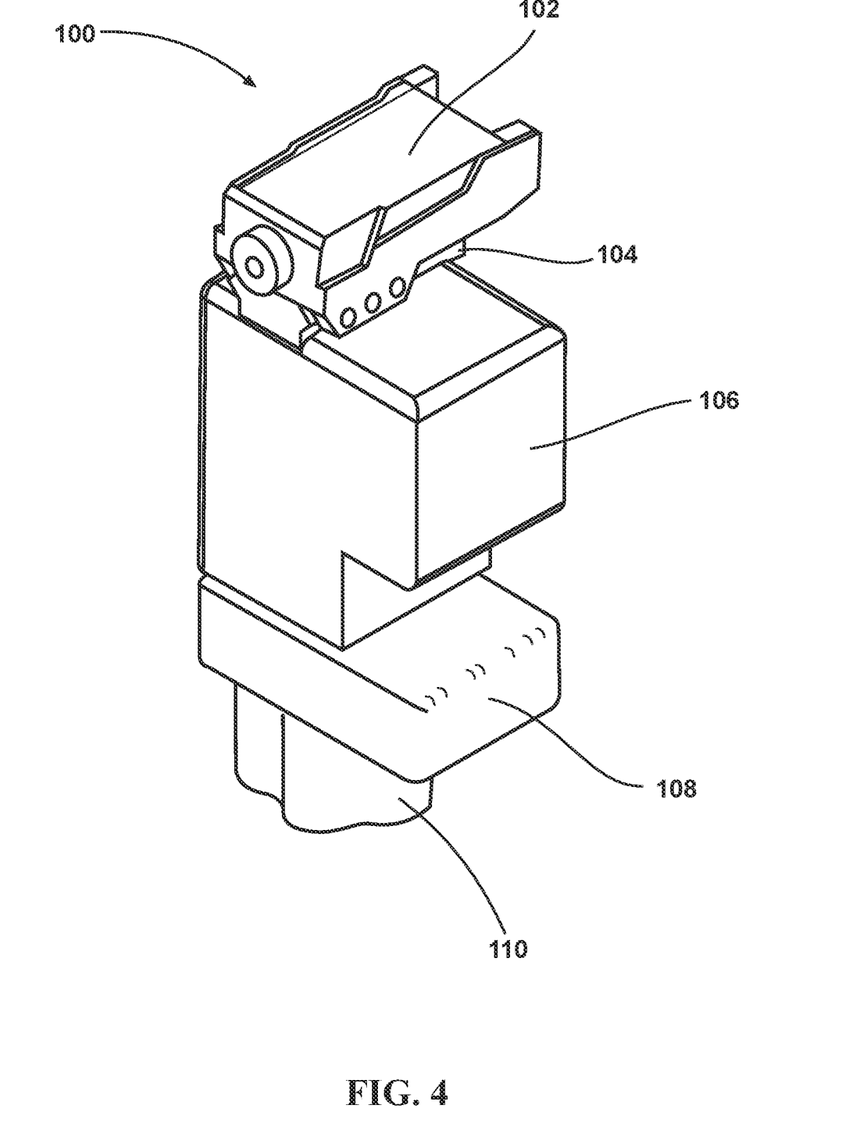
FIG. 4 is a perspective view of the laser transmitter assembly.

FIG. 4 is a perspective view of the laser transmitter assembly 100. The assembly shows the laser transmitter 102 connected to the mounting block 106 through a connector element 104. The screw block 108 is connected to the mounting block in a manner that permits the transmitter assembly 100 to clamp onto a rail 32 or 42 by way of a hand screw 110.

Figure 5:
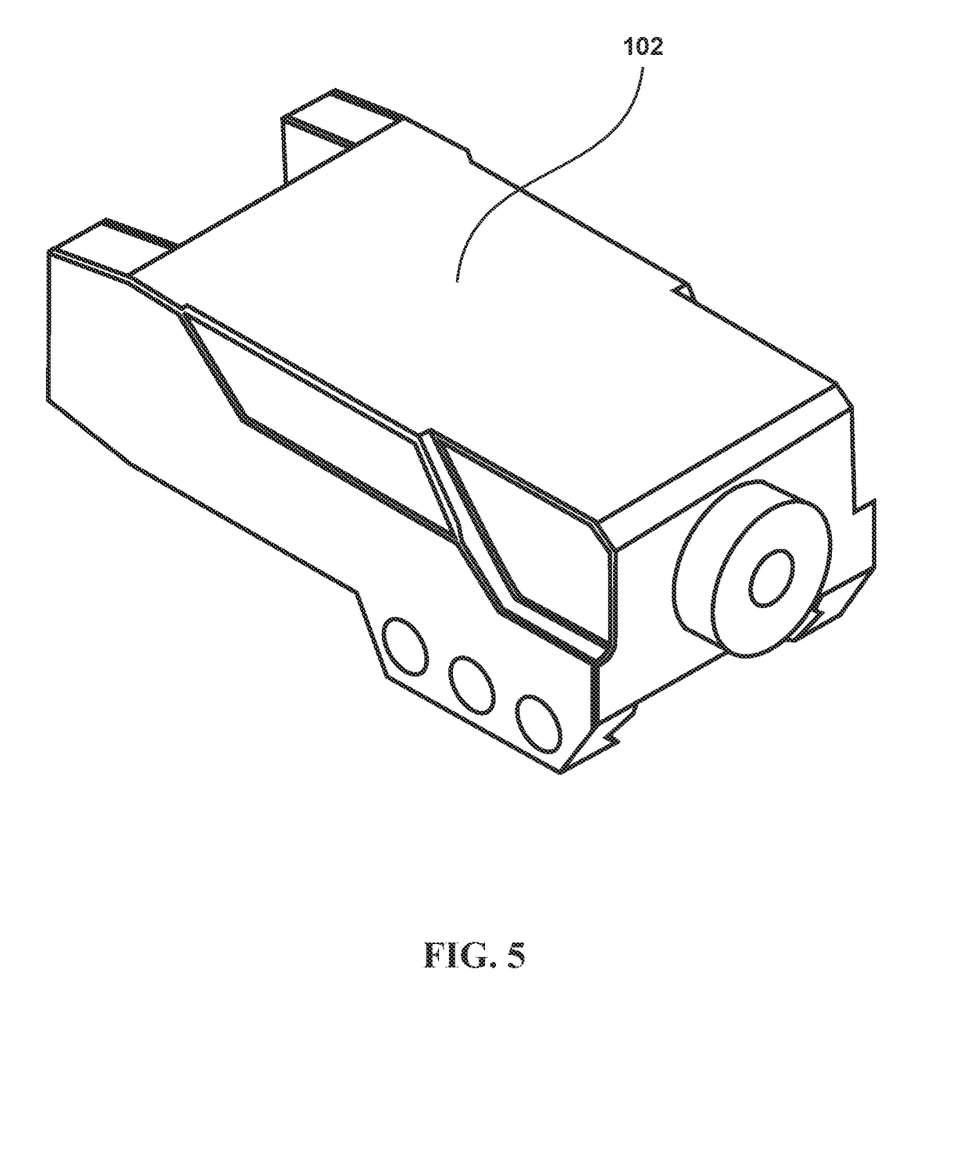
FIG. 5 is a perspective view of a laser transmitter.
Figure 6:
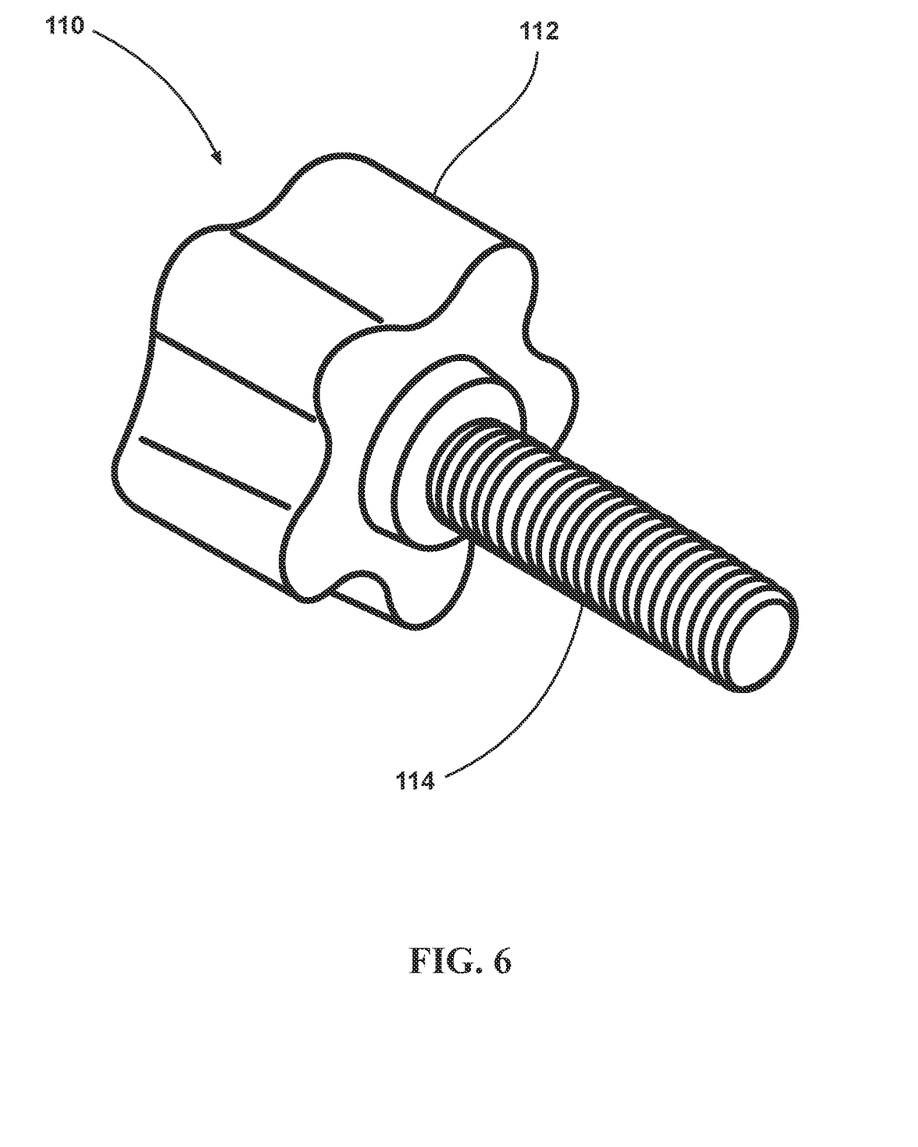
FIG. 6 is a perspective view of a hand screw.

FIG. 5 shows a perspective view of a laser transmitter 102. The laser transmitter 102 can simply be an off the shelf commercial type or alternatively can be manufactured specifically for this application. FIG. 6 is a perspective view of a hand screw 110. The hand screw 110 includes a knob 112 with a threaded shaft 114 extending therefrom. It should be noted that other fastener or tightening means may be used without departing from the teachings of the present disclosure. By way of example and not limitation, the hand screw 110 may be substituted with a traditional bolt or screw whereby a tool such as a wrench or screwdriver is used to tighten the screw block 108 and the mounting block 106 together and lock the laser transmitter assembly 100 to a rail 32 or 42.

Figure 7:
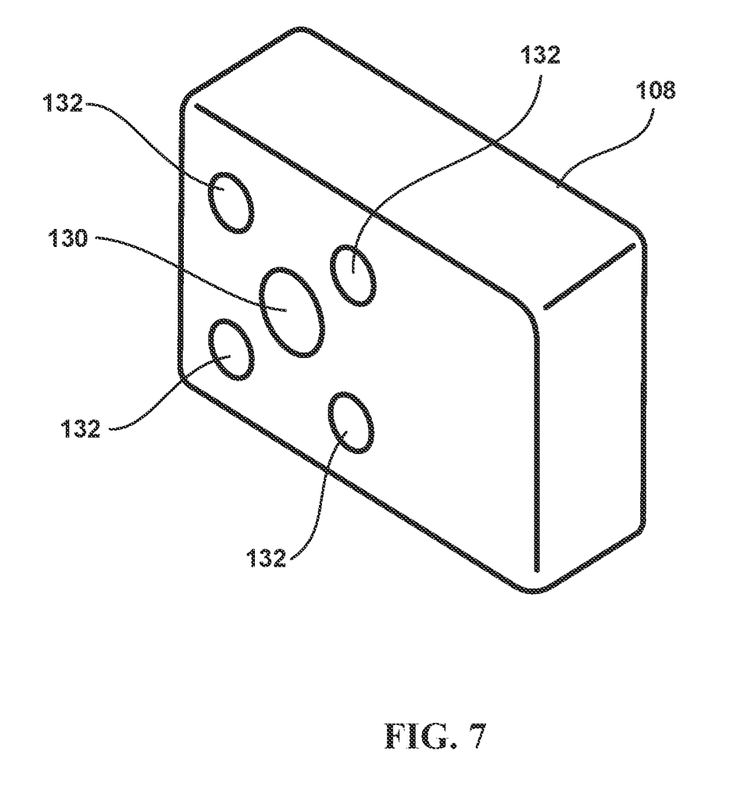
FIG. 7 is a perspective view of a screw block.

FIG. 7 is a perspective view of a screw block 108. The screw block 108 includes a plurality of mounting holes 130 used to hold dowel rods (not shown) to extend between the screw block 108 and the mounting block 106 to keep them aligned while clamping onto a rail 32, 42. A central threaded aperture 130 can be configured to permit the threaded shaft 114 of the hand screw 110 to threadingly engage therewith. In other embodiments, the central aperture may be a smooth bore such that the threaded rod 114 just slides through and then threadingly engages with the mounting block 106.

Figure 8:
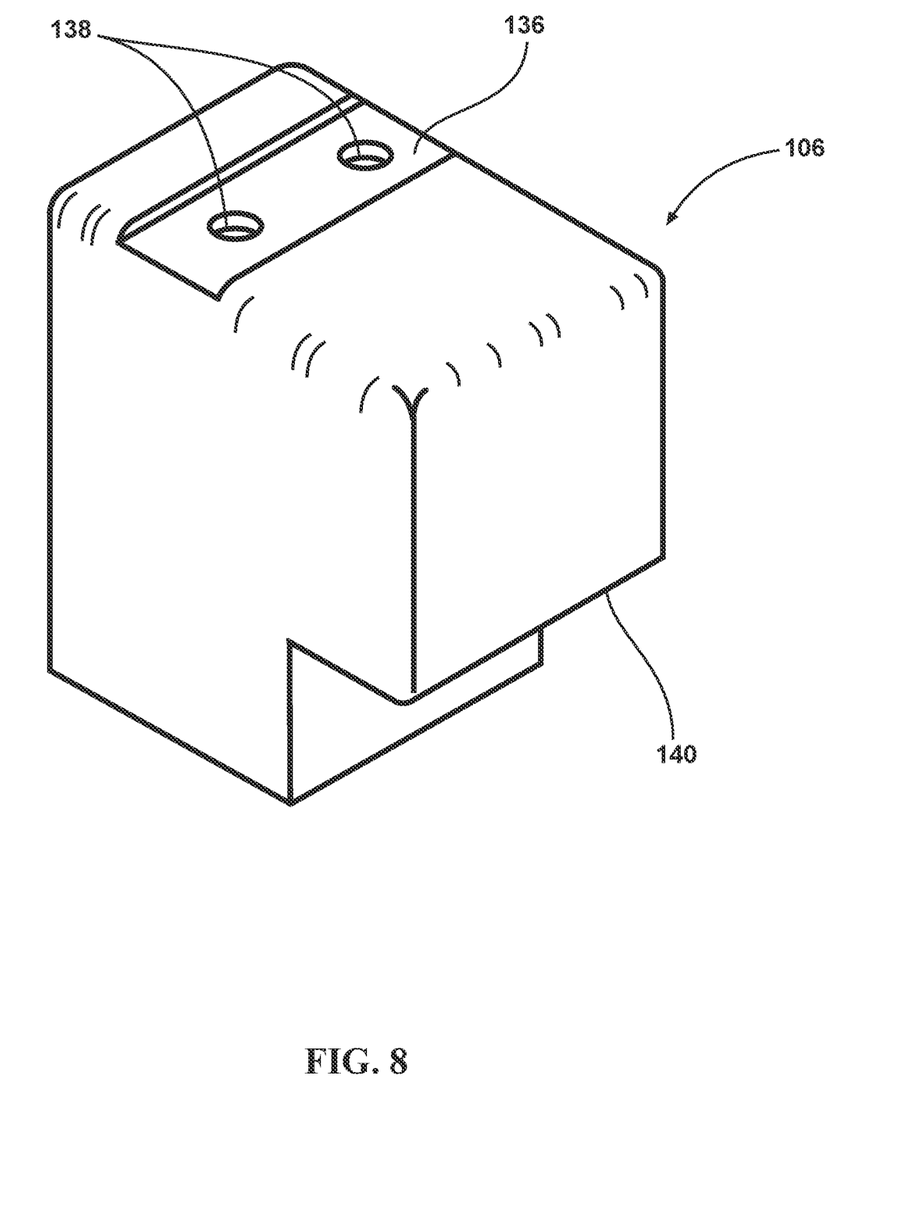
FIG. 8 is a perspective view of a laser mounting block.

FIG. 8 is a perspective view of a laser mounting block 106. The mounting block 106 includes a receiving slot 136 with threaded apertures 138 configured to receive the connector element 104. Threaded fasteners (not shown) may be used to couple the connector element 104 to the mounting block 106. A clamp face 140 protrudes outward from the body of the mounting block 106. The clamp face 140 extends over an end portion of the screw block 108 such that opposing clamp surfaces of the clamp face 140 of the mounting block 106 and the screw block 108 will engage with a rail 32 or 42 and the hand screw 110 is used to tighten them together and fixing the laser transmitter assembly 100 to the rail 32 or 42.

Figure 9:
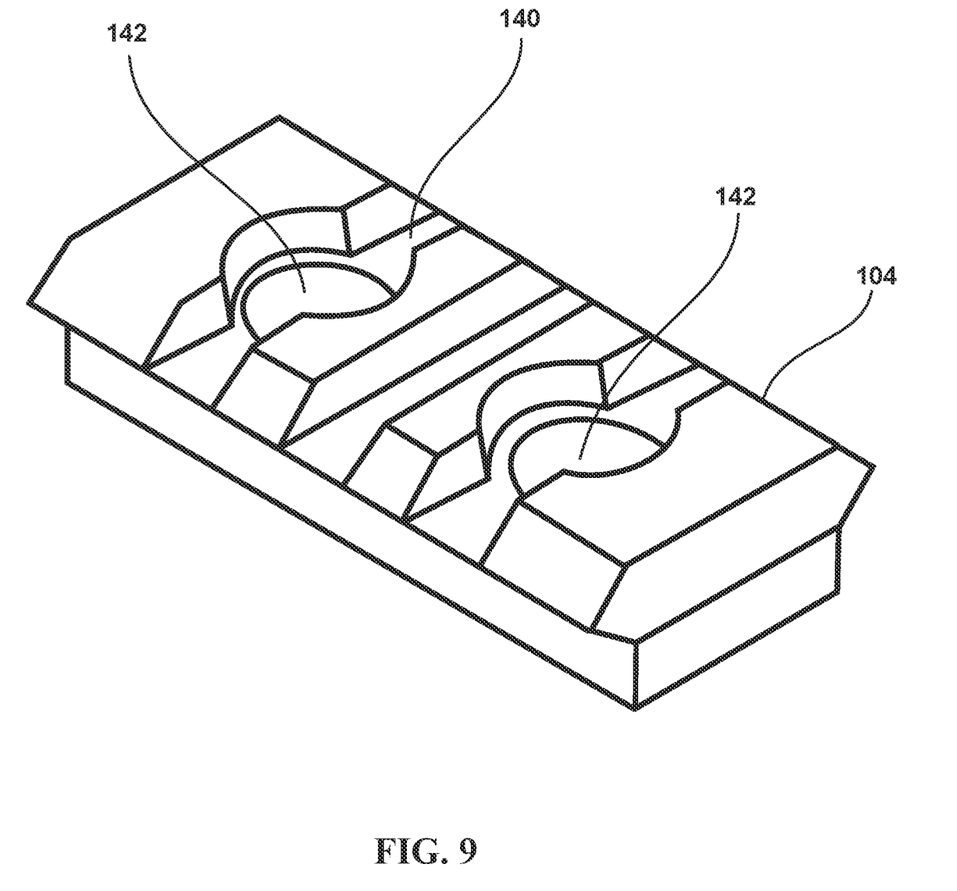
FIG. 9 is a perspective view of a connector element.

FIG. 9 is a perspective view of a connector element 104. In one form, the connector element 104 similar to a picatinny rail wherein tongue and groove or dovetail features can be used to help lock the connector element 104 lock the laser module 102 to the mounting block 106. The connector element 104 can include one or more screw apertures 144 with a centerline slot 144 passing across laterally from one side to the other. It should be understood that in other forms, other connecting means may be used to connect the laser module 102 to the mounting block.

Figure 10:
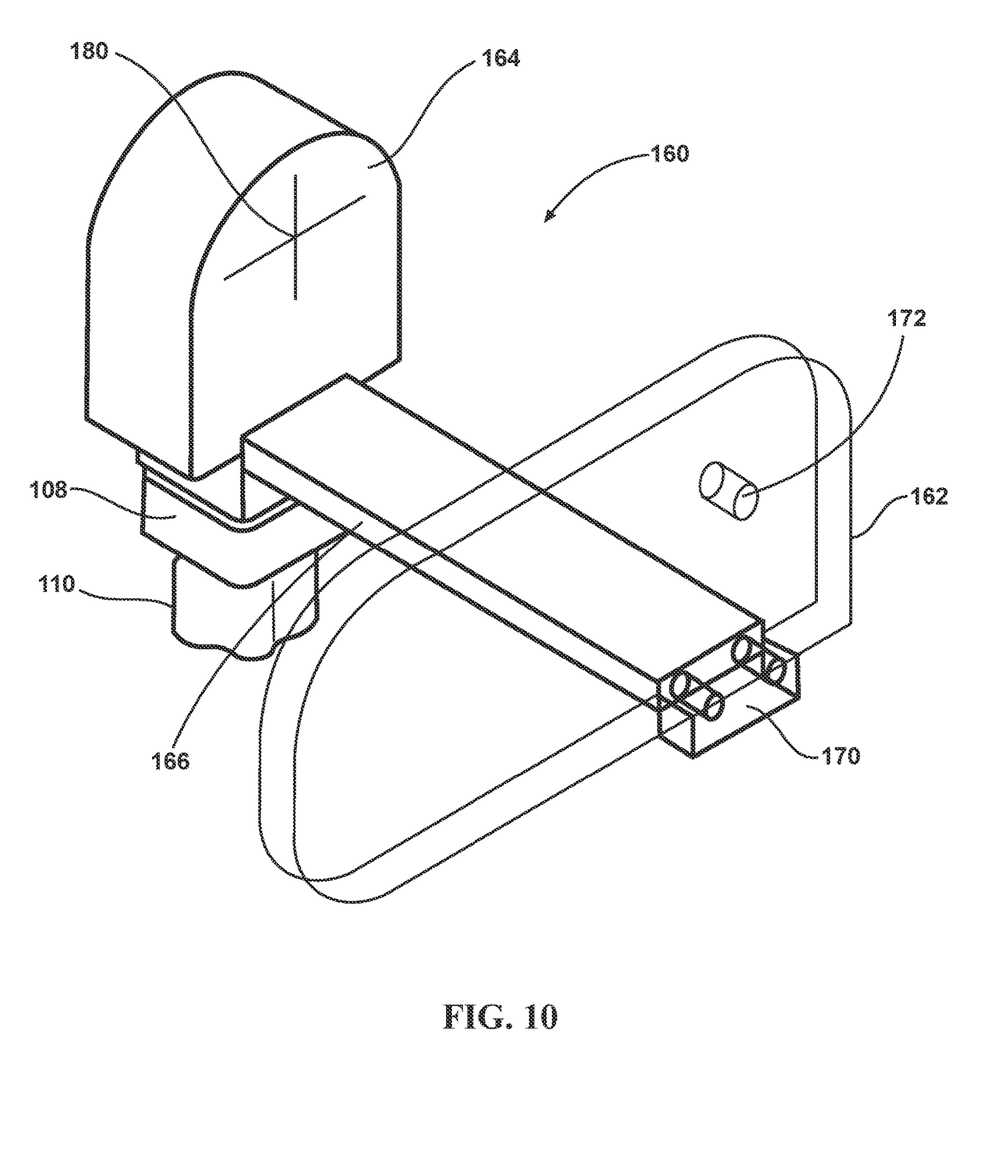
FIG. 10 is a perspective view of a laser target receiver assembly.
Figure 11:
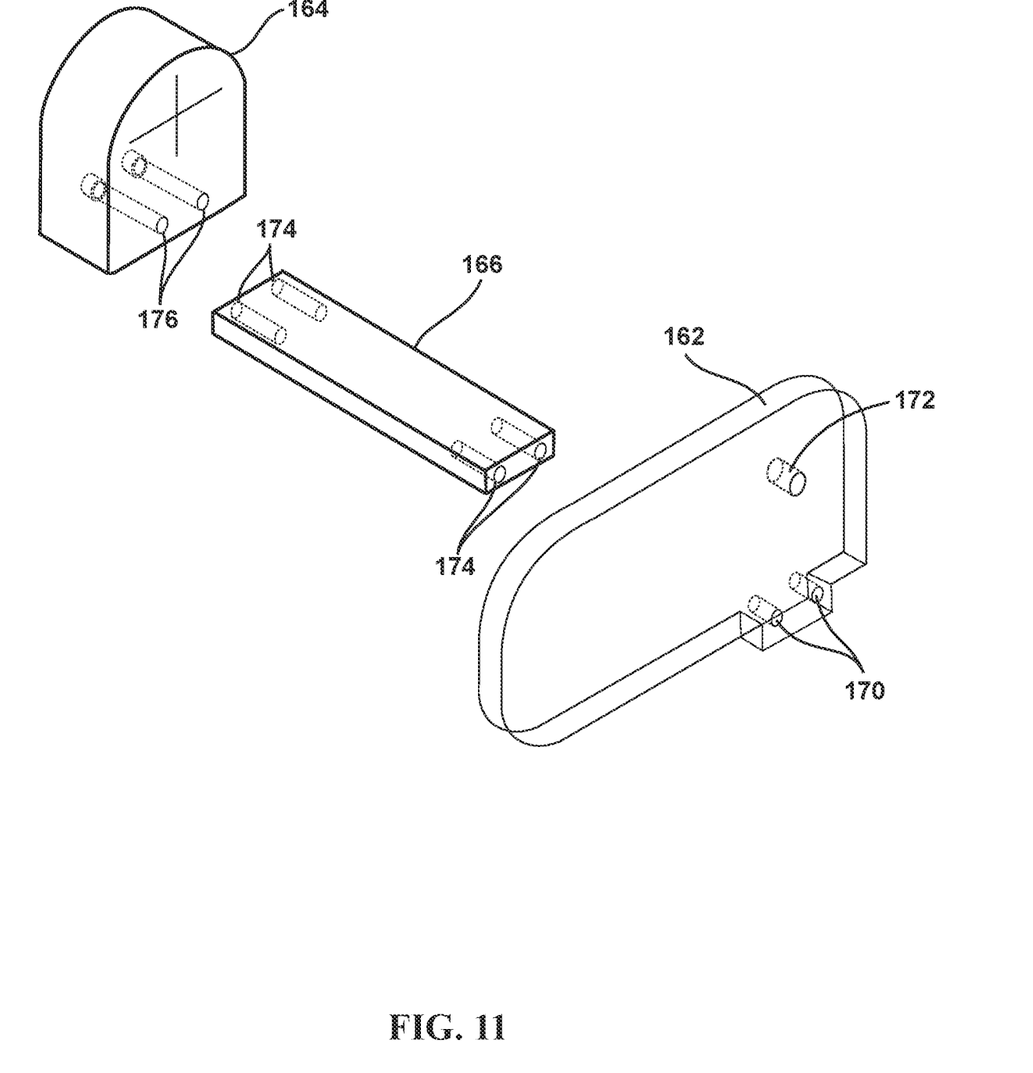
FIG. 11 is an exploded view of a portion of the laser target receiver assembly of FIG. 10.

Referring now to FIGS. 10 and 11, the laser target receiver assembly 160 is shown in a perspective view and in a partially exploded view respectively. The laser target receiver assembly 160 includes a forward target plate 162 spaced apart from a target block 164. A target bridge 166 connects the forward target plate 162 to the target block 164. In the disclosed form, the target bridge 166 is an elongate rectangularly shaped member, however other shapes and configurations may be employed without departing from the teachings of the present disclosure. Threaded fasteners (not shown) may be used to engage with attachment holes 170 formed in the forward target plate 162 and thread into threaded apertures 174 formed in an end of the target bridge 166. The target block 164 is connected to the other end of the target bridge 166 in the same manner as the forward target plate 162 connection. The laser target receiver assembly 160 is fixed to a rail 32 or 42 in a similar manner as the laser transmitter assembly 100. The screw block 108 and the target block 164 are locked to a rail 32 or 42 via a tightened hand screw 110.

The forward target plate 162 includes a laser alignment hole 172 formed through the wall at a predetermined location. The target block 164 includes a laser target point 180 that in the disclosed form is an alignment reticle. When the rails 42 of the engine trailer 40 are aligned with the rails 32 of the engine bay 30, the laser beam 168 will pass through the laser alignment hole 172 and hit the center of the laser target point 180 on the target block 164. When the laser beam 168 is on the laser target point 180 then the engine 20 is properly aligned and can safely be moved from the rails 42 of the trailer 40 onto the rails 32 of the engine bay 30 and installed in the aircraft.

In one aspect the present disclosure is directed to a system for installing an aircraft engine into an aircraft engine bay, comprising: an installation trailer having a pair of parallel trailer rails extending longitudinally from an aft end to a forward end thereof; a laser transmitter assembly coupled to at least one of the trailer rails; a pair of engine bay rails positioned within the engine bay of the aircraft; and a laser receiver target assembly coupled to at least one of the engine bay rails.

In refining aspects the laser transmitter assembly includes a slot connector slidingly connectable for a laser element; the laser transmitter assembly includes a mounting block configured to couple with the slot connector; the mounting block includes a clamp face protruding from a side wall; the laser transmitter assembly includes a screw block attached to the mounting block; the clamp face of the mounting block and a top wall of the screw block engage with a trailer rail; the laser transmitter assembly includes a hand screw that threading engages through the screw block and into the mounting block such that the laser transmitter assembly is fixed in place with the trailer rail when the hand screw is tightened; wherein the laser receiver target assembly includes: a forward target plate with a laser alignment hole formed therethrough; a target block with a laser target point positioned on a wall thereof; and a bridge connecting the target plate to the target block; wherein the laser receiver target assembly further includes: a target screw block connected to the target block; wherein the target screw block and target block cooperate to clamp the laser receiver target assembly to at least one of the engine bay rails; and a target hand screw operable for threadingly coupling the target screw block and target block together and provide a clamping force to fix the laser receiver target assembly in a desired position.

In another aspect the present disclosure incudes a laser alignment system for aligning an aircraft engine during installation, comprising: a laser transmitter assembly coupled to at least one rail of an installation trailer or at least one rail in an engine bay of the aircraft; and a laser receiver target assembly coupled to the other of the at least one rail of an installation trailer or the at least one rail in the engine bay of the aircraft.

In refining aspects, the laser transmitter assembly is coupled to each of two parallel rails of either the engine trailer or the engine bay; a laser receiver target assembly is coupled to each of two parallel rails of either the engine trailer or the engine bay; the laser transmitter assembly includes a laser transmitter element operable for projecting a red or green laser beam. The laser alignment system further comprises a connector element that slidingly receives and holds the laser transmitter element in a fixed location; a mounting block having a protruding clamp face engageable with one surface of a trailer rail or engine bay rail; a screw block having an opposing clamp face engageable with another surface opposite of the one surface to cooperate with the mounting block to clamp the laser transmitter assembly to the rail; a hand screw threadingly engageable with the screw block and the mounting block to impart a clamping force onto the rail; wherein the laser receiver target assembly includes: a forward target plate having an alignment hole formed therethough; a target block spaced apart from the forward target plate; an alignment reticle positioned on a wall of the target block; a bridge connected to the target plate and the target block; and wherein a laser beam passes through the alignment hole and projects onto the alignment reticle when the rails of the trailer are aligned with the rails of the engine bay. The laser alignment system further comprises: a target screw block connectable to the target block; and a target hand screw configured to tighten the target screw block and target block to a rail and hold the laser receiver target assembly in a fixed location.

In another aspect the present disclosure is defined by a method comprising: placing a laser transmitter assembly on at least one rail of either an engine trailer and an engine bay of an aircraft; placing a laser receiver target assembly on at least one rail of the other of an engine trailer and an engine bay of an aircraft, opposite of the laser transmitter assembly; transmitting a laser beam from the laser transmitter; aligning an engine trailer such that the laser beam passes through an alignment hole in a forward target plate and impacts an alignment reticle on a target block of the laser receiver target assembly; moving the engine trailer adjacent to the engine bay while maintaining laser alignment; sliding an engine from rails on the engine trailer to rails in the engine bay; and installing the engine into the aircraft.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system for installing an aircraft engine into an aircraft engine bay, comprising:
   an installation trailer having a pair of parallel trailer rails extending longitudinally from an aft end to a forward end thereof;
   a laser transmitter assembly coupled to at least one of the trailer rails;
   a pair of engine bay rails positioned within the engine bay of the aircraft; and
   a laser receiver target assembly coupled to at least one of the engine bay rails;
   wherein the laser receiver target assembly includes:
   a target block with a laser target point positioned on a wall thereof
   a target screw block connected to the target block;
   wherein the target screw block and target block cooperate to clamp the laser receiver target assembly to at least one of the engine bay rails; and
   a target hand screw operable for threadingly coupling the target screw block and target block together and provide a clamping force to fix the laser receiver target assembly in a desired position.

2. The system of claim 1, wherein the laser receiver target assembly includes:
   a forward target plate with a laser alignment hole formed therethrough; and
   a bridge connecting the target plate to the target block.

3. The system of claim 1, wherein the laser transmitter assembly includes a slot connector slidingly connectable for a laser element.

4. The system of claim 3, wherein the laser transmitter assembly includes a mounting block configured to couple with the slot connector.

5. The system of claim 4, wherein the mounting block includes a clamp face protruding from a side wall.

6. The system of claim 5, wherein the laser transmitter assembly includes a screw block attached to the mounting block.

7. The system of claim 6, wherein the clamp face of the mounting block and a top wall of the screw block engage with one of the trailer rails.

8. The system of claim 7, wherein the laser transmitter assembly includes a hand screw that threading engages through the screw block and into the mounting block such that the laser transmitter assembly is fixed in place with the trailer rail when the hand screw is tightened.

9. A laser alignment system for aligning an aircraft engine during installation, comprising: a laser transmitter assembly coupled to at least one rail of an installation trailer or at least one rail in an engine bay of the aircraft; a laser receiver target assembly coupled to the other of the at least one rail of an installation trailer or the at least one rail in the engine bay of the aircraft; and wherein the laser receiver target assembly is coupled to each of two parallel rails of either the installation trailer or the engine bay.

10. The laser alignment system of claim 9, wherein the laser transmitter assembly is coupled to each of two parallel rails of either the installation trailer or the engine bay.

11. The laser alignment system of claim 9 wherein the laser transmitter assembly includes a laser transmitter element operable for projecting a red or green laser beam.

12. The laser alignment system of claim 11, further comprising a connector element that slidingly receives and holds the laser transmitter element in a fixed location.

13. The laser alignment system of claim 9 wherein each of the laser receiver target assemblies includes: a forward target plate having an alignment hole formed therethough; a target block spaced apart from the forward target plate; an alignment reticle positioned on a wall of the target block; a bridge connected to the target plate and the target block; and wherein a laser beam passes through the alignment hole and projects onto the alignment reticle when the rails of the trailer are aligned with the rails of the engine bay.

14. The laser alignment system of claim 13 further comprising:
a target screw block connectable to the target block; and
a target hand screw configured to tighten the target screw block and target block to a rail and hold the laser receiver target assembly in a fixed location.

15. The laser alignment system of claim 9 further comprising a mounting block having a protruding clamp face engageable with one surface of a trailer rail or engine bay rail.

16. The laser alignment system of claim 15 further comprising a screw block having an opposing clamp face engageable with another surface opposite of the one surface to cooperate with the mounting block to clamp the laser transmitter assembly to the rail.

17. The laser alignment system of claim 16 further comprising a hand screw threadingly engageable with the screw block and the mounting block to impart a clamping force onto the rail.

18. A laser alignment system for aligning an aircraft engine during installation, comprising:
a laser transmitter assembly coupled to at least one rail of an installation trailer or at least one rail in an engine bay of the aircraft;
a laser receiver target assembly coupled to the other of the at least one rail of an installation trailer or the at least one rail in the engine bay of the aircraft;
wherein the laser receiver target assembly includes:
a forward target plate having an alignment hole formed therethough;
a target block spaced apart from the forward target plate;
an alignment reticle positioned on a wall of the target block;
a bridge connected to the target plate and the target block; and
wherein a laser beam passes through the alignment hole and projects onto the alignment reticle when the rails of the trailer are aligned with the rails of the engine bay;
a target screw block connectable to the target block; and
a target hand screw configured to tighten the target screw block and target block to a rail and hold the laser receiver target assembly in a fixed location.

\* \* \* \* \*